United States Patent [19]

Gilch et al.

[11] Patent Number: 4,707,515

[45] Date of Patent: Nov. 17, 1987

[54] MOISTURE-CURABLE SEALANT COMPOSITIONS

[75] Inventors: Heinz G. Gilch, Bad Homburg; Wolfgang Haar, Oberursel, both of Fed. Rep. of Germany

[73] Assignee: USM Corporation, Farmington, Conn.

[21] Appl. No.: 850,468

[22] Filed: Apr. 11, 1986

[30] Foreign Application Priority Data

Apr. 26, 1985 [GB] United Kingdom ............... 8510690

[51] Int. Cl.$^4$ ................................................ C08F 8/32
[52] U.S. Cl. ..................................... 524/506; 525/102
[58] Field of Search ......................... 525/102; 524/506

[56] References Cited

U.S. PATENT DOCUMENTS

| | | | |
|---|---|---|---|
| 3,925,286 | 12/1975 | Fahey | 525/102 |
| 3,955,036 | 5/1976 | Plueddmann | 525/102 |
| 4,284,548 | 8/1981 | Kaufman et al. | 525/102 |
| 4,291,136 | 9/1981 | Keogh | 525/102 |
| 4,319,007 | 3/1982 | Khattab | 525/102 |
| 4,369,232 | 1/1983 | Scopazzi | 525/102 |
| 4,468,492 | 8/1984 | Piccirilli et al. | 525/102 |
| 4,559,387 | 12/1985 | Endo et al. | 525/102 |

*Primary Examiner*—Joseph L. Schofer
*Assistant Examiner*—Bernard Lipman
*Attorney, Agent, or Firm*—Thomas S. Szatkowski

[57] ABSTRACT

The specification is concerned with sealant compositions comprising prepolymers which are capable of being cured by atmospheric moisture. The compositions provide a desirable blend of properties with regard to application and use, using prepolymers derived from comparatively inexpensive raw materials. The prepolymers correspond to a reaction product of an at least substantially linear acrylate ester polymer having a Tg of not greater than 10° C. with a hydrolysable silane having a saturated organo-functional group, the reaction product being a fluid material soluble in organic solvents and curable by exposure to atmospheric moisture to a resilient solid. The prepolymer is a silane-modified polymer which preferably has from 2 to 3 hydrolysable silane groups per molecule of prepolymer and from 1 to 3 hydrolysable groups per silane group. Preferred acrylate ester polymers are homo- or co-polymers of butyl acrylate; copolymers may contain other acrylate monomers and or may contain up to 50 wt % vinyl monomer e.g. styrene. Preferred silanes are aminosilanes particularly those having 2 or 3 hydrolysable alkoxy groups. Also described and claimed are methods of making the prepolymers. The compositions are suited for construction and glazing sealants.

16 Claims, No Drawings

MOISTURE-CURABLE SEALANT COMPOSITIONS

BACKGROUND OF THE INVENTION

This invention is concerned with improvements in or relating to moisture-curable sealant compositions.

Various sealant compositions are available which are intended to be cured by exposure to atmospheric moisture. For example moisture-curable sealants are known which are based on isocyanate-terminated polyurethanes or based on silicone polymers. Whilst such products yield seals of good quality, they are accompanied by technical or economic disadvantages. For example, sealants based on isocyanate-terminated polyurethanes are unsuitable for packaging and storage in plastic cartridges as evidence of curing of the sealant in such packages is apparent after several months storage. In those cases where a bubble-free seal is essential, precautions must be taken to alleviate bubble formation as a result of production of carbon dioxide during the curing process. Also, heat-resistance of the seals formed is only moderate in many cases. Sealants based on silicone polymers generally have highly desirable properties and yield seals of high quality which perform well under many conditions of use; in particular it is possible to produce a clear, transparent seal and to achieve excellent ultra violet light stability using sealant compositions based on silicone polymers. Such compositions are, however, expensive.

Among objects of the present invention are to provide a sealant composition curable by atmospheric moisture to form a resilient seal at ambient temperatures and based on comparatively cheap raw materials, and to provide a sealant composition having a desirable blend of properties for convenient application and which is capable of cure by atmospheric moisture to provide seals of desirable quality.

It has been proposed to provide polymers having hydrolysable silyl groups by addition reaction between unsatuated polymers and for example chlorosilanes. It has also been proposed to provide polymers bearing hydrolysable silyl groups by addition reaction between unsaturated acrylate monomers and unsaturated silane monomers. Addition reactions generally require particular techniques, reaction conditions and controls in order to procure polymers of required structure and properties, and we would prefer to use a process involving condensation reaction using techniques familiar in the art of condensation polymerisation.

It has been proposed to provide a silane-modified alkylene alkacrylate copolymer comprising at least 50 mol percent alpha olefin units and polymerised units containing a hydrolysable silane radical attached to the polymer backbone via an ester, thioester or amido group. Such copolymer materials generally are solids of comparatively high glass-transition temperature and are not suitable as atmospherically-curable sealant compositions for application at room temperature, not only because they tend to cure to provide products of insufficient rubberiness for many sealant uses but also because their application characteristics and poor adhesive properties are inappropriate for sealant uses.

BRIEF SUMMARY OF THE INVENTION

We have now found that sealant compositions having desirable blends of properties in the uncured and cured states may be produced by use of certain fluid materials corresponding to a reaction product of selected acrylate ester polymers with selected hydrolysable silanes.

According to the present invention, a flowable sealant composition comprises a fluid prepolymer material corresponding to a condensation reaction product of an at least substantially linear acrylate ester polymer having a viscosity in the range of about 50 to about 2,000 Pas determined using an 80% solution in xylene at 23° C. and a glass-transition temperature (DSC Measurement method) not greater than about 10° C. with a hydrolysable silane having a saturated organo-functional group reactive with ester groups of the polymer, the acrylate ester polymer and silane being selected and used in quantities to provide a fluid prepolymer material which is soluble as defined and which is curable by exposure to atmospheric moisture to a resilient solid.

By "soluble as defined" is meant capable of being dissolved completely in methylene chloride under agitation at 20° C.

An important feature of the invention is the selection of reactants for the prepolymer. From this, important properties of the cured sealant are derived including the ability of the sealant composition to be applied readily to horizontal or vertical joints, to become cured to a tough resilient condition by exposure to atmospheric moisture and also to provide a seal having good resistance to ageing by UV, heat and moisture, and resilience and extensibility in the joint. Some of these properties are dependent on the selection of the substantially linear acrylate ester polymer.

The flow properties of the sealant are dependent to some extent on the linear nature of the alkyl acrylate ester polymer used. Linear acrylate ester polymers are preferred (i.e. ones which are soluble in methylene chloride, tetrahydrofuran, toluene, xylene and ethyl acetate for example) but a minor amount of branching is acceptable provided that flow and other properties of the sealant composition are not adversely influenced to a significant extent. Acrylate ester polymers in general tend to have good ageing resistance, and they are also comparatively inexpensive.

In order to provide a cured sealant composition having desirable flexibility at temperatures to which the seals may be expected to be exposed, it is necessary to select a polymer having a glass-transition temperature (Tg) not greater than about 10° C. Tg of a polymer may be regarded as the temperature below which the polymer has reduced, and in most cases non-existent, rubbery properties. "Tg" is a conventional criterion and is described by Flory, "Principles of Polymer Chemistry", pages 56 and 57, Cornell University Press. While the Tg of a given polymer may be measured (e.g. by DSC measurement method), it also may be calculated as described by Fox, Bull. Am. Physics Soc. 1,3,p 153 (1956). Examples of Tg of certain polymers are given in Polymer Handbook 2nd Edition - J. Brandrup, E. H. Immergut, published by John Wiley and Sons as follows;

| Homopolymer of | Tg |
| --- | --- |
| octyl acrylate | −65° C. |
| n-decyl methacrylate | −70° C. |
| n-butyl acrylate | −52° C. |
| octyl methacrylate | −20° C. |
| methyl acrylate | +10° C. |
| methyl methacrylate | +105° C. |

Sealants intended for exterior use are expected to be exposed to temperatures below 0° C., and for such sealant compositions we prefer to select polymers having a Tg less than 0° C., preferably less than about −10° C., more preferably in the range about −15° C. to about −30° C. or even lower for certain applications.

Molecular weight and viscosity of the polymer are also of importance. If the viscosity of the polymer is too low, the viscosity of the prepolymer and sealant composition prior to curing may be too low for convenient application. If the molecular weight of the polymer is too low, the crosslink density of the cured polymer may be high enough for brittle films with low elongations at break to result which are not suited for sealant applications. High viscosities of the polymers on the other hand may lead to use of excessive amounts of solvents or plasticisers in order to obtain sealant compositions with sufficiently high extrusion rates, with consequent risk of shrinkage or weakening of the cured seal. Polymers which are preferred for making prepolymers of the sealants are those which have a number average molecular weight (Mn) between 5,000 and 100,000, more particularly 10,000 to 70,000, more preferably 20,000 to 40,000 as determined by gel permeation chromatography using U-Styragel $10^5$, $10^4$, $10^3$, 500 Å columns calibrated with polystyrene standards.

As is known, a distribution of molecular weights exists in any finite sample of polymer, and the number average molecular weight Mn reflects the most probable molecular weight of the majority of the polymer molecules in the sample measured. This value is an important guide to various properties including tensile strength. Similarly, the weight average molecular weight Mw of a sample of polymer is usually not less than the number average molecular weight. The Mw value is relevant to viscosity of the polymer and prepolymer. The ratio Mw/Mn may be used as a measure of the breadth of molecular weight distribution of molecules in the sample. Polymers used to provide prepolymers of sealant compositions according to the invention preferably have weight average molecular weight (Mw) values as low as possible, commensurate with desired Mn values. Uniform polymer chain length is desirable in relation to the possibility to produce more uniform network structures in the cured sealant composition and thus uniform mechanical properties throughout the seal. However, the Mw value of the starting polymer is determined to some extent by the manufacturing procedure for the polymer, which is directed primarily to achieving a satisfactory Mn value. We have found that polymers having an Mw value as great as 10 times as high as the Mn value can be used to provide prepolymers for acceptable sealant compositions. In general, we prefer the Mw value to be in the range of about 100,000 to about 300,000.

Suitable polymers have low viscosities as determined using an 80% solution in xylene at 23° C. Viscosities as low as about 50 Pas may be used but sealant compositions satisfactory for various purposes may be achieved with polymers having viscosities as high as about 2,000 Pas. Preferred polymers have a viscosity in the range of 150 Pas to 750 Pas, as determined using an 80% solution in xylene at 23° C.

The polymer of Tg not greater than 10° C. may be for example a homopolymer or copolymer of acrylic or methacrylic esters. The esters may be represented by the formula I

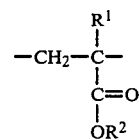

wherein $R^1$ is a hydrogen atom or a methyl group and $R^2$ is a hydrogen atom or a linear or branched alkyl radical having 1 to 18 carbon atoms. Examples of suitable homopolymers include poly-n-butylacrylate having a Tg of about −52° C. Copolymers of mixtures of monomers of Formula I may be employed, for example those based on n-butyl acrylate and ethyl hexylacrylate, or butyl acrylate and methyl acrylate. Inclusion of some methyl acrylate in producing the polymer is advantageous in that its residues are comparatively readily silylated, but large amounts lead to undesirably high Tg of the polymers with consequent sacrifice of mechanical properties of the sealant. Copolymers of one or more monomers of Formula I and vinyl monomers also may be employed. The term "vinyl monomer" is used to describe a monomer which is derived from at least one of the following groups, namely the 5 vinylidene group $CH_2=C<$, the vinyl groups $CH_2=CH—$, or the vinylene group $—CH=CH—$. As examples are mentioned $\alpha,\beta$-ethylenically unsaturated nitriles, hydrocarbons like $\alpha$-olefins and conjugated diolefins, vinyl aryl compounds, vinyl alkyl ethers, vinyl halogenides and vinylidene halogenides. One single monomer or a mixture of several vinyl monomers may be used. Preferably the vinyl monomer is styrene and is used in amount of about 5% to about 50%. The only limitation placed on the vinyl monomers is that, in combination with the other monomers of the polymer, they do not adversely affect the desired properties of the sealant, (e.g. unduly raise the overall glass-transition temperature Tg of the polymer or unduly lower the heat resistance of the seal). Examples of suitable copolymers of Formula I and vinyl monomers include those based on butyl acrylate and styrene and those based on butyl acrylate,methyl acrylate and styrene in a ratio 70:10:20 by weight. We prefer to use alkyl acrylate ester polymer comprising not less than 70% by weight butyl acrylate. Preferred acrylate ester copolymers having a Tg of about −15° C. to about −30° C. are based on butyl acrylate and styrene monomers. The most preferred polymers have residues of these materials in a ratio by weight of about 80% butyl acrylate to 20% styrene, a Tg of about −19° C., (measured by DSC method) and Mn (measured by gel permeation as referred to above) in the range about 20,000 to about 40,000.

The fluid prepolymer material is a silane-modified polymer produced by bringing about condensation reaction between the saturated organo-functional groups of the hydrolysable silane and acrylate groups of the selected polymer.

Suitable hydrolysable silanes are those capable of reaction with the acrylate polymer to yield a fluid prepolymer material which can be caused to crosslink with moisture. They include materials of the general Formula II.

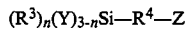

in which $R^3$ is a lower alkyl radical having from 1 to 5 carbon atoms, n=0, 1 or 2, Y is a hydrolysable group for example halogen, a substituted amino group, or an organic radical bound through an oxygen, nitrogen or sulphur atom to the Si atom for example

—NR$^6$R$^7$, —OR$^6$, —SR$^6$

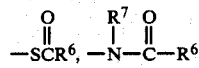

where R$^6$ and R$^7$ are the same or different namely hydrogen or an alkyl, cycloalkyl, aryl, alkaryl or aralkyl radical, and in which when n=0 or 1 and thus two or more Y groupings are present, the Y groupings are the same or different, R$^4$ is a divalent hydrocarbon radical, a divalent hydrocarbon ether radical or a divalent hydrocarbon amine radical and Z is a saturated organo-functional group.

The organo-functional group Z is of importance in the prepolymer forming reaction, and is chosen from groupings capable of chemical reaction to replace residues from the ester groupings of the acrylate ester polymer. Various such Z groupings are known for example

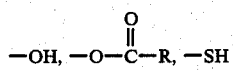

and amino. It will be appreciated that silanes having such groupings may be caused to undergo condensation reaction with acrylate ester groupings of the polymer, to yield alcohol or ester and polymer bearing silane groups linked to the polymer through ester, thio ester or amido groupings. With regard to stability of the sealant composition and cured seal, we prefer to use ester silanes or amino-silanes which lead to ester or more preferably amido linkages between hydrolysable silane groupings and the polymer. We prefer to use commercially available silanes. Silanes which have unsaturated groupings, for example methacrylate groupings which may enter into subsequent chemical reaction, are not used in order to more easily control stability of the product. Of the commercially available silanes, we have found that by use of an amino-silane a facile controllable process can be achieved yielding substantially innocuous by-products. Accordingly, we prefer to employ silanes in which the group Z is —NHR$^5$ and in which R$^5$ is an alkyl radical or preferably a hydrogen atom.

The grouping Y is also important in relation to the materials present in the cured seal. It is preferred to ensure that by-products of the hydrolysis of the hydrolysable groupings are innocuous. We prefer to employ alkoxy silanes.

Where the speed of cure is important, as it usually is, the commercially available silanes having two or three hydrolysable alkoxy groups are especially suitable. Preferred examples are γ-amino propyl triethoxysilane, γ-amino propyl trimethoxysilane, γ-amino propyl methyl diethoxy silane.

The preferred amino-silanes react through their amino groups —NHR$^5$ with an ester group

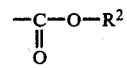

of the polymer molecular chain so that an amide group is formed, through which the hydrolysable silane groupings are linked to the polymer chain thus:

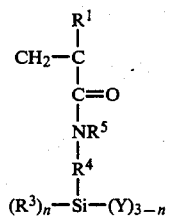

Formula III with elimination of R$^2$OH. In the case where butyl or methyl alcohol is eliminated we have found it unnecessary to take steps to specifically remove this from the fluid material, nor is it essential to remove unused silane from the reaction mixture.

The reaction product of the polymer and hydrolysable silane should have sufficient hydrolysable silane groups to enable linking to occur between the chains of the molecules via the hydrolysable groups, when exposed to moisture of the air, to yield ≡Si—O—Si≡ groups linking the chains. It is necessary to have present sufficient hydrolysable groups to enable conversion of the fluid material to a resilient solid but not sufficient hydrolysable groups to result in so much linking between chains as to yield hard, brittle, inflexible solids, which are unsuited for use as sealants. The amount of silane to be added to a given batch of polymer is dependent to some extent on the molecular weight of the individual polymer chains of the batch. It is desirable to use just sufficient silane to ensure that on average from two to three silane groups become linked to each polymer chain. The amount theoretically required for this purpose can be calculated from the number average molecular weight of the polymer and the molecular weight of the silane. For optimum results, as shown by insolubility of the moisture cured product in methylene chloride, flexibility and elasticity of the moisture cured product, and ageing properties of the moisture cured product, it is desirable to adjust this calculated amount of silane to polymer. It is assumed that by this step, compensation is made for the molecular weight distribution of polymer molecules actually present, and for the deviation of the measured Mn and the actual Mn values. The adjustment necessary to achieve sealant compositions with optimum properties using a particular polymer-silane combination is consistent with providing in general terms prepolymer having from 2 to 3 hydrolysable silane groups per molecule of prepolymer and 1 to 3 hydrolysable groups per silane group. For example using preferred polymers and preferred amino-silanes as discussed, it is appropriate for the calculated amounts of amino-silane to be as follows:

| Number average molecular weight of polymers (Mn) determined as described above. | Weight % of amino silane |
|---|---|
| 5,000 | 1.2 to 3.6 |
| 10,000 | 0.6 to 1.8 |
| 20,000 | 0.4 to 1.2 |

| Number average molecular weight of polymers (Mn) determined as described above. | Weight % of amino silane |
|---|---|
| 30,000 | 0.3 to 0.9 |
| 40,000 | 0.2 to 0.8 |
| 70,000 | 0.1 to 0.7 |
| 100,000 | 0.05 to 0.5 |

As noted, for each batch of polymer some adjustment of the selected value is likely to be desirable to secure a prepolymer and cured seal having the most desired combination of properties. In general, smaller amounts of amino-silane within the ranges shown are preferred as these lead to seals which are less densely crosslinked, and so provide sealant materials of better quality which may be essential for some applications. Where seals of higher modulus are acceptable, larger amounts of amino-silane may be used within the ranges shown. Using polymers of Mn about 30,000 to about 60,000 we prefer to use about 0.3 to about 0.6% by weight of the preferred hydrolysable amino-silanes. Stated another way, we prefer to ensure that the prepolymer material does not contain more than about 5%, more preferably not more than about 1% on a weight basis of the groups represented by the Formula III in order to ensure the desired elasticity of hydrolysed product.

The prepolymers have glass-transition temperatures substantially the same as the starting polymer. It is important that the prepolymer has sufficient fluidity for use as a basis for the sealant composition. Prepolymers which are not in themselves sufficiently liquid may be diluted with solvent or plasticisers. It is important for flow properties of the sealant composition, and for control of the quality of seals produced, to ensure that the prepolymer is at least substantially linear. This is achieved by selection of the starting polymer and quantity of silane used, and is reflected by the complete solubility of the prepolymers as defined. Preferred prepolymers are completely soluble in methylene chloride, toluene, xylene, ethyl acetate and other usual solvents, and have viscosities in the range of about 100 to about 1,000 Pas measured in 80% by weight solution in xylene at 23° C.

In order to ensure that the prepolymer retains its desirable characteristics, it is necessary to exclude moisture from the prepolymer forming reaction and from the prepolymer until use.

In one convenient method of making preferred prepolymers for sealant compositions according to the invention, the polymer is charged to a glass reaction vessel as a solution in xylene and dried using a drying agent which is not reactive with the polymer or amino-silane, for example a tetra alkoxy silane, in presence of a catalyst for the amidation reaction, for example dibutyl tin dilaurate, a titanate, a zirconate or dibutyl tin acetate. The mixture is stirred at 120° C. until a water content of less than 100 ppm and preferably less than 60 ppm has been reached. The mixture is cooled, and a preferred hydrolysable amino-silane is added, and the mixture kept at a temperature in the range 100° C. to 150° C., preferably about 140° C. for about 3 hours.

Using the preferred polymer and hydrolysable amino-silane in this way in suitable quantities, we have found that not less than about 90% of the hydrolysable amino-silane is used up, and that analysis of the prepolymer product showed the nitrogen content of the prepolymer corresponded closely with the amount of nitrogen of the hydrolysable amino-silane consumed in the reaction. The product was found to be a fluid material curable by atmospheric moisture under room conditions to a resilient solid, having a surface receptive to household paints.

Sealant compositions according to the present invention are flowable compositions conveniently consisting of one part only, and require no curative other than atmospheric moisture. They are preferably of dough-like consistency and keep this consistency as long as they are stored protected against water or moisture. The prepolymers of the sealant compositions cure within a short time with atmospheric moisture to a permanently resilient product which preferably is elastic. The permanence of the cure of the prepolymer to a cross-linked network is characterised by the hydrolysed product being insoluble in methylene chloride as demonstrated by the fact that the cured product is resistant to Soxhlet extraction conditions using dichloromethane.

Prepolymers of sealant compositions according to the invention are curable by atmospheric moisture to an extent such that 50% or more, and more preferably not less than about 80% of the cured material is not extractable by Soxhlet extraction using dichloromethane. The rate at which the compositions become cured is dependent on relative humidity, temperature and presence of catalyst. A desirable cure rate for sealants curing at room temperature is about 1 mm thickness per day, and this can be achieved with sealant compositions according to the invention which include catalyst materials. We have found that 2 mm thick test pieces cast from sealant compositions made by the method above referred to and containing no additional catalyst or other adjuvants, exposed to atmosphere at 50% RH and 20° C. cure to provide tack free films after several hours, and cure to an insoluble condition (i.e. not less than 50% of the hydrolysed prepolymer remains unextractable by Soxhlet extraction using dichloromethane) over a period of up to four weeks. Cure to similar conditions may be accelerated, for example to two weeks or less by inclusion of appropriate amounts of condensation catalysts.

Curing of sealant compositions according to the invention takes place at ambient temperatures by humidity via the hydrolysable silane groups of the prepolymer. Crosslinking reactions of this kind are known to the art and may be accelerated by condensation catalysts as they are used for example in silicone sealants. As condensation catalysts one may use organic or inorganic acids, e.g. p-toluenesulfonic acid and phosphoric acid and mono and diesters thereof salts of organic acids, e.g. tin naphthenate, tin octoate, tin butyrate, dibutyltin dioctoate, dibutyltin dilaurate, dibutyltin diacetate, iron stearate, lead octoate, or organic amines, e.g. isophorone, 4,4'-methylenedianiline, imidazole, and the like. Preferred condensation catalysts are organo-tin salts, e.g. dibutyltin dilaurate and dibutyltin diacetate. The compositions of this invention may contain from about 0.1 to about 5%, and preferably from about 0.2 to about 1.0% of these catalysts.

Sealant compositions according to the invention include an effective amount of the fluid prepolymer material. In fact the fluid material may provide the major part of the sealant composition, or it may be compounded with quantities of additives according to the desired properties and use of the seal. Sealant compositions according to the invention may comprise about 1% to about 99%, preferably about 20% to about 80% of the prepolymer mixed, if necessary, with fillers, solvents, plasticisers, adhesion promoters, or other additives known in the sealant art.

Compositions according to the present invention are particularly suited to seal joints which may be subjected to movements, e.g. as a result of expansion of a joint between two building materials. The preferred use for sealants of that kind is building construction, window construction and wet room application.

Depending on the viscosity, flowability and sag resistance required of the sealant composition and the elasticity and transparency of seal desired, the amount and type of the prepolymer, solvents and other ingredients, the composition may contain 0 to 90% finely divided fillers. Examples of fillers which may be used are calcite, limestone, mica, talc, asbestos fibres or powder, diatomaceous earth, barium sulfate, alumina, slate flour, calcium silicate, colloidal and fumed silica, magnesium carbonate, and magnesium silicate. Some of these fillers have the additional advantage of yielding a reinforcing effect in the cured composition which may be employed to increase the cohesive strength of the cured sealant.

No special demands are made on the solvents. They only serve to lower the viscosity of the sealant composition. Suitable solvents include toluene, xylene, and light petrol of aliphatic, aromatic or naphthenic character, e.g. white spirit, acetone, dioxane, ethyl acetate and others.

In some cases it is advantageous to add a plasticiser to the formulation to make the cured seal more flexible at lower temperatures. Appropriate to this purpose are all plasticisers which are compatible with the prepolymer and the cured polymer, e.g. phthalate, adipate, sebacate, phosphoric acid esters, and non-chlorinated and chlorinated hydrocarbon plasticisers. Generally, the plasticiser causes a reduction of the glass-transition temperature and the viscosity, and so lower amounts of solvents may be used, resulting in less shrinkage of the seal as solvent evaporates.

Preferred sealant compositions comprise 55 to 75% by weight prepolymer, 20 to 30 parts by weight of ester plasticiser, and 5 to 15 parts by weight fumed silica.

A sealant composition according to the invention may comprise an adhesion promoter to improve the adhesion, e.g. to glass or metals. Silanes may be used for this purpose, for example mercaptopropyl trimethoxysilane, glycidoxypropyl trimethoxysilane, (3,4-epoxycyclohexyl) ethyl trimethoxysilane, and aminopropyl triethoxysilane. The concentration of the silane adhesion promoter may vary between about 0.05 and about 10%, preferably about 0.5% to about 5% by weight of the composition. Compositions according to the invention may also contain other additives well known to the art, like drying agents, thixotropic agents and UV and oxidation stabilisers.

Further according to the invention, a method of making a prepolymer having hydrolysable silane groups attached to the prepolymer chain and suitable for use in a sealant composition comprises reacting an alkyl acrylate ester polymer having a viscosity in the range of about 50 to about 2,000 Pas determined using an 80% solution in xylene at 23° C. and a glass-transition temperature of less than about 10° C. with a hydrolysable amino-silane or hydrolysable ester silane in solution which is dried prior to addition of the amino-silane or ester silane by heating in presence of an alkoxy silane to a water content of less than 100 ppm water, in presence of a catalyst and a solvent.

DETAILED DESCRIPTION OF PREFERRED EMBODIMENTS OF THE INVENTION

In order that the invention may be better understood there now follows a detailed description of various examples of methods of making prepolymers for use in sealant compositions according to the invention and of sealant compositions according to the invention. It is to be understood that these examples have been selected to illustrate the invention by way of example only and not by way of limitation.

EXAMPLE 1

A moisture-curable acrylate prepolymer was prepared by heating 70 parts poly-n-butylacrylate (Mw=250,000, Mn=62,000 and glass-transition temperature of about $-52°$ C.), 30 parts of toluene, 4 parts tetramethoxysilane and 0.5 parts dibutyltin dilaurate until dry (less than 100 ppm water), and then heating this mixture with 1.6 parts of aminopropyl methyldiethoxysilane for 4 hours to 140° C. The prepolymer was soluble as defined. 62.1 parts of this prepolymer were blended with 25.9 parts of dioctyl adipate and 12.0 parts of hydrophobic fumed silica to provide a sealant composition. The composition was of a fluid dough-like consistency and could be caused to flow and spread with a spatula. The homogeneous mixture was cast into a film of approximately 2 mm thickness and cured for two weeks at 50° C. and 100° C. relative humidity. The film cured to a resilient solid and revealed a tensile strength of 1.2 N/mm$^2$ and elongation at break 100%.

EXAMPLE 2

A copolymer made of 70% n-butyl acrylate, 10% methyl acrylate and 20% stryene (Mw=214,000, Mn=40,000 and Tg of about $-22°$ C.) was reacted as described in Example 1 with aminopropyl methydiethoxysilane to give a fluid prepolymer, soluble as defined. 69 parts of this prepolymer were blended with 25 parts butylbenzylphtalate, 6 parts hydrophobic fumed silica, 1.5 parts tetramethoxysilane and 1.0 parts dibutyltin dilaurate to provide a sealant composition. The composition was of a fluid, dough-like consistency and could be caused to flow and spread with a spatula. 2 mm thick films cast from this mixture and exposed for two weeks at 50° C. and 100% RH cured to a resilient solid and revealed a tensile strength of 0.6 N/mm$^2$ and elongation at break of 400%.

EXAMPLE 3

A drying agent—amidation catalyst was prepared using a 100 ml, round bottom flask fitted with a magnetic stirrer, a heating and distillation column and column head. The flask was charged with 50.5 g dibutyltin diacetate and 11.4 g tetramethoxy silane and heated slowly, in the course of approximately 4 h, to 185° C. During this time the reaction product methyl acetate was continuously removed by distillation. At the end of this process vacuum was applied for one hour to remove all of the methyl acetate. The reaction mixture was then cooled down to approximately 100° C, and 30 liters toluene were added. The mixture was agitated until a homogeneous solution was obtained, and then further diluted with toluene to provide a 50% solution. This solution was directly taken as drying and amidation catalyst.

A prepolymer was made in the following way, 49 Kg of an 80% xylene solution of a copolymer of 80% n-butyl acrylate and 20% styrene (Mw=145×10$^3$; Mn=27×10$^3$; viscosity 724 Pas at 23° C., glass-transition temperature-28° C.) were charged into a reactor equipped with agitator, heating and reflux condenser. To this were added 1.55 Kg of the drying agent tetramethoxy silane and 0.25 Kg of the drying agent and amidation catalyst. The mixture was stirred under nitrogen and heated to 120° C. After one hour at 120° C. the water content of the reaction mixture had dropped to 0.005% as determined by Karl Fischer titration, and 0.22 Kg of γ-aminopropyl methyldiethoxysilane were added. The temperature was raised to 140° C. The course of the reaction was repeatedly determined by the amine titer of the reaction mixture. After one hour at 140° C. a conversion of 99% was found and the temperature was lowered to 80° C. and the product filled into suitable containers. Viscosity of this product was 555 Pas at 23° C. and volatile content 20%. The product was completely soluble in solvents like toluene, xylene, acetone, ethyl acetate and others, and thus soluble as defined. The prepolymers had a glass-transition temperature of −25° C.

Mechanical properties of a cured prepolymer film were examined as follows. 1% of the curing catalyst dibutytin dilaurate was added to the prepolymer and mixed thoroughly. The mixture was cast into films of approximately 2mm thickness and cured for two weeks at 50° C. and 100% relative humidity to form a resilient solid. The films revealed then the following mechanical properties:

| | |
|---|---|
| Modulus at 100% elongation | 0.07 N/mm$^2$ |
| Tensile strength at break | 0.6 N/mm$^2$ |
| Elongation at break | 420% |

Solubility of the cured films measured by Soxhlet extraction using dichloromethane; insolubles were 78.1%.

Three flowable sealant compositions I, II and III were made up, using this prepolymer, in a planetary mixer comprising materials as follows:

| | I (weight %) | II (weight %) | III (weight %) |
|---|---|---|---|
| Prepolymer | 66.0 | 67.2 | 67.0 |
| Dibutylphthalate | 25.8 | 26.2 | 26.2 |
| Aerosil R972 | 6.2 | 6.3 | 6.3 |
| Dibutyltin dilaurate | 1.0 | 1.0 | — |
| Toluenesulfonic acid | — | — | 0.2 |
| Methyl orthoformic ester | — | — | 0.3 |
| Dynasil M | 1.0 | — | — |

Dynasil M is a tetramethoxysilane.

Films of approximately 2mm thickness were cast from the formulations. The films from compositions I and II were cured two weeks at 50° C., 100% relative humidity. The films from composition III were cured 22 days at 23° C. and 50% relative humidity. Mechanical properties found were:

| | I | II | III |
|---|---|---|---|
| Modulus at 100% elongation (N/mm$^2$) | 0.3 | 0.10 | 0.14 |
| Tensile strength at break (N/mm$^2$) | 1.5 | 0.34 | 0.48 |
| Elongation at break % | 390 | 250 | 180 |
| Soxhlet extractions of the cured films with dichloromethane: | | | |
| Solids | 69.1 | 50.2 | 55.5(%) |

All the sealant compositions of Examples 1, 2 and 3 were found to have adhesion to aluminium, glass, glazed ceramics. It was also found that seals produced from the compositions had surfaces amenable to painting with household paints.

We claim:

1. A flowable sealant composition comprising a fluid prepolymer material corresponding to a condensation reaction product of an at least substantially linear alkyl acrylate ester polymer comprising a homopolymer of n-butylacrylate, or a copolymer of n-butylacrylate with ethyl hexylacrylate or methylacrylate or styrene or with methylacrylate and styrene wherein said copolymer comprises not less than 70% by weight n-butylacrylate, said acrylate ester polymer having a viscosity in the range of about 50 to about 2,000 Pas determined using an 80% solution in xylene at 23° C. and a glass-transition temperature (DSC measurment method) of less than −15° C. with a hydrolysable silane having a saturated organo functional group reactive with ester groups of the polymer, said hydrolysable silane comprising one or more of γ-amino propyl triethoxysilane, γ-amino propyl trimethoxysilane and γ-amino propyl methyl diethoxysilane, the acrylate ester polymer and silane being selected and used in quantities to provide a fluid prepolymer material which is soluble as defined and which is curable by exposure to atmospheric moisture to a resilient solid.

2. A composition according to claim 1 wherein the acrylate ester polymer has a number average molecular weight (Mn) between about 5,000 and about 100,000.

3. A composition according to claim 1 wherein the acrylate ester polymer has a number average molecular weight between about 20,000 and about 40,000.

4. A composition according to claim 1 wherein the acrylate ester polymer has a weight average molecular weight in the range about 100,000 to about 300,000.

5. A composition according to claim 1 wherein the acrylate ester polymer has a viscosity in the range about 150 to about 750 Pas as determined using an 80% solution in xylene at 23° C.

6. A method of making a prepolymer having hydrolysable silane groups attached to the prepolymer chain and suitable for use in a sealant composition comprising reacting a substantially linear alkyl acrylate ester polymer comprising a homopolymer of n-butylacrylate, or a copolymer of n-butylacrylate with ethyl hexylacrylate or methylacrylate or styrene or with methylacrylate and styrene wherein said copolymer comprises not less than 70% by weight n-butylacrylate, said acrylate ester polymer having a viscosity in the range of about 50 to about 2,000 Pas determined using an 80% solution in xylene at 23° C. and a glass transition temperature (DSC measurement method) of less than −15° C. with a hydrolysable amino silane which comprises one or more of γ-amino propyl triethoxysilane, γ-amino propyl trimethoxysilane and γ-amino propyl methyl diethoxysilane in solution which alkyl acrylate ester polymer is dried prior to addition of the amino silane by heating in presence of an alkoxy silane to a water content of less than 100 ppm water in presnece of a catalyst and a solvent.

7. A method according to claim 6, wherein the acrylate ester polymer has a number average molecular weight (Mn) between about 5,000 and about 100,000.

8. A method according to claim 6, wherein the acrylate ester polymer has a number average molecular weight between about 20,000 and about 40,000.

9. A method according to claim 6, wherein the catalyst comprises dibutyl tin dilaurate, dibutyl tin diacetate, a titanate or a zirconate.

10. A method according to claim 6, wherein the reaction is carried out in presence of a reaction product of dibutyl tin diacetate and tetramethyoxy silane.

11. A prepolymer made by a method according to claim 6.

12. A sealant composition comprising a prepolymer which is the product of a method according to claim 6.

13. A sealant composition according to claim 1, comprising a condensation catalyst.

14. A sealant composition according to claim 1, comprising 0 to 90% by weight finely divided filler.

15. A sealant composition according to claim 1, comprising about 0.05 to about 10% by weight of a silane adhesion promoter.

16. A sealant composition according to claim 1, comprising 55 to 75 parts by weight prepolymer, 20 to 30 parts by weight of ester plasticiser, and 5 to 15 parts by weight fumed silica.

* * * * *